Patented Apr. 13, 1954

2,675,374

UNITED STATES PATENT OFFICE 2,675,374

PREPARATION OF DIAZOAMINO DERIVATIVES

Pierre Petitcolas, Rouen, André Paul Richard, St-Ouen, Oissel, Robert Frédéric Michel Sureau, Mont-St-Aignan, René Pierre Victor Roe, Rouen, and Jean Ernest Develotte, St-Etienne-du-Rouvray, France, assignors to Compagnie Francaise des Matieres Colorantes S. A. R. L., Paris, France, a French company No Drawing. Application September 9, 1952, Serial No. 308,695

Claims priority, application France September 21, 1951

2 Claims. (Cl. 260—140)

The present invention relates to improvements in the preparation of diazoamino derivatives.

In accordance with the present invention it has been found that diazoamino derivatives which may be obtained by condensing, in a non-acid medium, a diazo or tetrazo derivative, containing no solubilising group other than the diazonium group, with an N-substituted derivative of glycine having the following general formula

$$HOOC—A—NH—CH_2—CO—R \qquad (I)$$

wherein A represents a member selected from the group consisting of the unsubstituted o-phenylene group, the halogen-substituted o-phenylene group, the alkyl-substituted o-phenylene group and the alkoxy-substituted o-phenylene group and R represents a member selected from the group consisting of the hydroxyl group, the alkoxy group and the amino group, can be easily isolated in the solid state by precipitating them from their solutions with the aid of caustic alkali and by filtering off the products thus precipitated.

The condensation of certain diazo or tetrazo derivatives with certain N-substituted derivatives of glycine having the general Formula I is described in the co-pending application No. 308,694; the present invention is not concerned with condensation itself, but with the precipitation with the aid of caustic alkali of the condensation products defined in the preceding paragraph.

Suitable diazo or tetrazo compounds for use in the process of the present invention are for example those derived from aniline, from the toluidines, xylidines, cresidines or the anisidines substituted or not by one or more halogen atoms, from the nitranilines, nitrotoluidines, nitroanisidines, nitrocresidines, monoacylated paradiamines substituted or not by one or more halogen atoms or by one or more alkyl or alkoxy groups, from benzidine, from the tolidines, dianisidines, aromatic bases containing sulphamido, sulphone or trifluoromethyl groups, aminobenzothiazoles, aminoindazoles, amino azo dyestuffs and, generally, products known on the market as "solid bases."

These diazo or tetrazo compounds are condensed in a non-acid medium, as in the preparation of ordinary diazoamino derivatives, with an N-substituted derivative of glycine of the above general Formula I. Suitable acids are, for example, N-(2-carboxyphenyl)-glycine, N-(2-carboxy-3-chlorophenyl)-glycine, N-(2-carboxy-4-chlorophenyl)-glycine, N-(2-carboxy-5-chlorophenyl)-glycine, N-(2-carboxy-4:6-dichlorophenyl)-glycine, N-(2-carboxy-3:6-dichlorophenyl)-glycine, N-(2-carboxy-3:4-dichlorophenyl)-glycine, N-(2-carboxy-5-methoxyphenyl)-glycine, N-(2-carboxy-4-methoxyphenyl)-glycine, N-(2-carboxyphenyl)-glycine-methylester, N-(2-carboxyphenyl)-glycine-ethylester and N-(2-carboxyphenyl)-glycinamide. All these acids are already known, except the N-(2-carboxy-4-methoxyphenyl)-glycine, which can be prepared for example by condensing 2-amino-5-methoxybenzoic acid with monochloracetic acid.

By the condensation of the diazo or tetrazo compound with the glycine derivative one obtains solutions of diazoamino derivatives but the diazoamino derivatives thus obtained are very sensitive to acid agents, and even to carbon dioxide, so that their isolation is very difficult. They are practically impossible to isolate by evaporation, even in vacuo, and they are generally soluble in brine so that they cannot be obtained by salting out.

The invention consists therefore in isolating these diazoamino derivatives in the solid state by adding caustic alkali to their solution or by proceeding to salt out in the presence of caustic alkali. The crystals obtained are easily filterable and can be dried at a moderate temperature either under vacuum or at ordinary pressure.

The diazoamino derivatives thus obtained can be mixed with coupling components and thus serve for preparing insoluble azo dyestuffs on the fibres of textile materials. Moreover certain of these diazoamino derivatives, in particular those which are obtained from aromatic monoamines or diamines of pronounced basicity such as for example the chloranilines, toluidines, cresidines, anisidines substituted or not by one or more halogen atoms, the monoacylated paradiamines substituted or not by one or more halogen atoms or by one or more alkyl or alkoxy groups, benzidine or ortho-dianisidine, have the advantage of splitting very rapidly on neutral steaming. This property renders the diazoamino compounds particularly valuable for printing textiles. In fact the inconveniences of acid steaming are well known and up to the present only a very small number of diazoamino derivatives were known to be capable of splitting by simple hydrolysis in an alkaline medium. The new diazoamino derivatives of the present invention are therefore of great technical interest.

The invention will be more clearly understood by reference to the following examples which are purely illustrative and in which the parts by weight and by volume designate any units of weight and volume whatever but corresponding to the same quantity of water.

*Example 1*

35.5 parts by weight of 5-chloro-2-amino-1-methyl-benzene are diazotized in the usual manner at 0–5° C. with 60 parts by volume of 21° Bé. hydrochloric acid and 17.5 parts by weight of sodium nitrite. The solution of the diazo compound is allowed to flow in half an hour under the surface of the liquid and with good agitation into a solution, maintained at −2° C. to −3° C. by external cooling and by the addition of ice and prepared from 65 parts by weight of the mono-sodium salt of N-(2-carboxyphenyl)-glycine, 300 parts of water and 70 parts by weight of sodium carbonate. The absorption of the diazo compound is rather rapid. After the flow has ceased, the mixture is neutralised gradually with a solution of caustic soda to clear alkalinity to thiazole yellow paper. A small quantity of insoluble products is eliminated by filtration and the residue on the filter is washed with a little water, the volume then being 1,200 parts. The diazoamino derivative is precipitated by adding 200 parts by weight of caustic soda in flakes. The temperature rises to 40–50° C. and the mixture is allowed to cool. The crystals isolated by filtration are dried at 40–50° C. In this manner 96 parts by weight of dry product are obtained.

*Example 2*

35.5 parts by weight of 4-chloro-2-amino-1-methyl-benzene are diazotized in the usual manner as in Example 1, with 60 parts by volume of 21° Bé. hydrochloric acid and 17.5 parts by weight of sodium nitrite at a temperature of 0–5° C. The final volume of the solution of diazo compound is 400 parts. This solution is allowed to flow in half an hour under the surface of the liquid and with good agitation into a solution prepared from 65 parts by weight of the mono-sodium salt of N-(2-carboxyphenyl)-glycine, 350 parts of water and 70 parts by weight of sodium carbonate. This solution is kept at −3° C. to −2° C. by external cooling by means of a refrigerating mixture and by the addition of ice. After the flow has ceased, the mixture is neutralized with caustic soda as in the foregoing example, filtered and the diazzoamino derivative is precipitated by adding to the filtrate 200 parts by weight of caustic soda in flakes and 200 parts by weight of sodium chloride. It is heated to 60–65° C. for a short time to favour the formation of crystals, which, after cooling, are filtered, well pressed and dried at moderate temperature. The yield is of the order of 80%.

*Example 3*

28.5 parts by weight of 86% dianisidine are pasted at 0–5° C. in 100 parts of water and 50 parts by volume of 22° Bé. hydrochloric acid. It is diazotized by allowing 28 parts by volume of a 50% by volume solution of sodium nitrite to flow in gradually. After stirring for one hour the mixture is filtered, and the filtrate allowed to flow, under the surface of the liquid in 45 minutes into a mixture containing 54 parts by weight of the mono-sodium salt of N-(2-carboxyphenyl)-glycine, 500 parts of water, 180 parts by weight of disodium phosphate dodecahydrate and 23 parts by volume of a 48° Bé. caustic soda solution and the necessary quantity of sodium carbonate to obtain alkalinity to β-yellow. When the flow of the tetrazo compound has ceased the mixture is neutralized to clear alkalinity to thiazole yellow. Precipitation of trisodium phosphate is brought about. It is then diluted with 800 parts of water, made alkaline with 200 parts by weight of flake caustic soda which brings about the precipitation of trisodium phosphate which is eliminated by filtration and washing with 14% caustic soda. The diazoamino derivative is precipitated by means of 350 parts by weight of common salt, filtered, well pressed and dried at moderate temperature. The yield is good.

*Example 4*

32 parts by weight of m-chloroaniline are diazotized with 34.5 parts by weight of a solution of 50% by volume of sodium nitrite and 62 parts by volume of 20° Bé. hydrochloric acid in 100 parts of water cooled by 100 parts by weight of ice. The diazo compound thus obtained is allowed to flow under the surface of the liquid with good agitation in half an hour into a solution, cooled to −3° C. to −4° C. and prepared from 66 parts by weight of the mono-sodium salt of N-(2-carboxyphenyl)-glycine, 200 parts of water and 70 parts by weight of carbonate of soda. In the course of the flow about 100 parts by weight of ice are added. The absorption of the diazo compound takes place rapidly. At the end of the flow the mixture is rendered neutral to thiazole yellow paper with caustic soda, filtered and the slight residue left on the filter is washed three times with 50 parts of water. The volume is then 950 parts. The diazo derivative is precipitated by the addition of 200 parts by weight of caustic soda in flake form and 100 parts by weight of common salt, allowing the temperature to rise. The crystals isolated by filtration are well pressed and dried at moderate temperature. The yield reaches 85%.

*Example 5*

31.5 parts by weight of 4-chloro-2-amino-1-methoxy-benzene are diazotized as in Example 1 with 50 parts by volume of concentrated hydrochloric acid and 14 parts by weight of sodium nitrate, and the diazo compound thus obtained is allowed to flow under the surface of the liquid in half an hour, as in the foregoing examples, at a low temperature into a solution of 54 parts by weight of the mono-sodium salt of N-(2-carboxyphenyl)-glycine, to which has been added 70 parts by weight of sodium carbonate. The precipitation and isolation of the diazoamino derivative is effected in the same manner as in Example 1. The yield obtained is of the order of 80%.

*Example 6*

17.8 parts by weight of the hydrochloride of 100% 4-chloro-2-amino-1-methyl-benzene are brought into solution in 100 parts of warm water. 20 parts by volume of 20° Bé. hydrochloric acid and of ice, then 14 parts by volume of a solution of sodium nitrite of 50% by volume are added while stirring. The temperature is then 8–10° C. After stirring the solution for 10 minutes the solution of the diazo compound is allowed to flow drop by drop under the surface of the liquid at ordinary temperature, into a well agitated solution of 28 parts by weight of N-(2-carboxy-4-chlorophenyl)-glycine, 40 parts by weight of carbonate of soda and 200 parts of water. The diazo compound is rapidly absorbed. Towards the end of the flow, it is gradually rendered alkaline to thiazole yellow paper by the slow addition of 14 parts by volume of a 48° Bé. solution of caustic soda. A very small quantity of insoluble products is eliminated by filtration and the sodium salt of the diazoamino derivative is precipitated by the addition of 200 parts by weight of solid caustic soda (total volume 500 parts). The product is precipitated at first in a slightly pasty form, and then rapidly crystallizes. It is filtered, pressed and dried at a moderate temperature. The yield is of the order of 80%.

Example 7

16.4 parts by weight of the hydrochloride of m-chloraniline are diazotized under the same conditions as in Example 6. The preparation and isolation of the diazoamino derivative are at all points identical with those of Example 6.

Example 8

30 parts by weight of 4-amino-1-benzoylamino-2:5-diethoxy-benzene are diazotized in the usual manner with 25 parts by volume of 20° Bé. hydrochloric acid and 7 parts by weight of sodium nitrite, at a temperature of 0–5° C. The solution of the diazo compound is then allowed to flow slowly under the surface of the liquid into a solution prepared from 35 parts by weight of N-(2-carboxy-4-methoxyphenyl)-glycerine, 50 parts by weight of sodium carbonate and 300 parts of iced water. The diazo compound is well absorbed. At the end of the flow the mixeture is gradually made alkaline towards thiazole yellow paper by means of dilute caustic soda. The diazoamino compound which results therefrom is isolated by the progressive addition of solid caustic soda. The crystals are filtered, pressed and dried in vacuo at a moderate temperature.

The N-(2-carboxy-4-methoxyphenyl)-glycine used was prepared by condensing 2-amino-5-methoxy benzoic acid with monochloracetic acid.

Example 9

225 parts by weight of amino-azo-toluene derived from o-toluidine are dissolved under the influence of heat in 2000 parts of water and 110 parts by volume of concentrated hydrochloric acid. The solution is allowed to cool and whilst agitating a further 190 parts by volume of concentrated HCl added. Ice is added to keep the temperature at 10° C. and it is diazotized by adding 140 parts by volume of 50% solution of sodium nitrite. At the end of half an hour one allows this solution of diazo compound to flow under the surface of the liquid at 0° C. into a solution of the following composition: 260 parts by weight of the disodium salt of N-(2-carboxyphenyl)-glycine, 250 parts by weight of $Na_2CO_3$ and 1000 parts of water. The flow lasts an hour and the diazo derivative is completely absorbed. There is then added 1500 parts by weight of solid NaOH. A gummy precipitate is formed which is decanted or which is stirred until it crystallizes, and which is filtered and dried under a vacuum at 40° C.

Example 10

A diazoamino derivative having the same properties as that described in Example 9 is obtained by replacing in the latter example the 260 parts by weight of the disodium salt of N-(2-carboxyphenyl)-glycine by 300 parts by weight of the sodium salt of N-(2-carboxy-5-chlorophenyl)-glycine.

Example 11

225 parts by weight of amino-azo-toluene derived from m-toluidine are pasted under the influence of heat in 2000 parts of water and 110 parts by volume of concentrated HCl. The mixture is cooled while adding ice with stirring to bring the temperature down to 10° C., 190 parts by volume of concentrated HCl are added, and it is diazotized by the addition of 150 parts by volume of a solution of 50% $NaNO_2$. The duration of the introduction is ½ hour and the duration of stirring one hour at 15° C. This solution of diazo compound is filtered and introduced in one hour under the liquid at a temperature of between 0° C. and 3° C. into a solution containing 260 parts by weight of the disodium salt of N-(2-carboxyphenyl)-glycine, 250 parts by weight of $Na_2CO_3$ and 1000 parts of water. The diazo derivative is rapidly absorbed. 400 parts by weight of solid NaOH is added in discrete portions, the mixture is stirred for one hour, filtered, pressed out and dried at a moderate temperature under vacuum.

Example 12

486.5 parts by weight of the diazonium salt of the formula

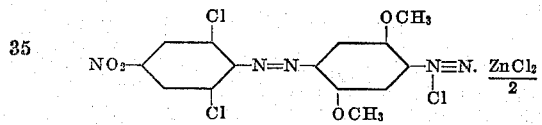

are dissolved in 20,000 parts of water at 35° C., filtered, and this solution introduced at between 5° C. and 10° C. in an hour into a solution prepared from 260 parts by weight of the disodium salt of N-(2-carboxyphenyl)-glycine, 150 parts by weight of $Na_2CO_3$ and 1000 parts of water. The diazo derivative rapidly disappears; 400 parts by volume of 48° Bé. NaOH is introduced, then 5000 parts by weight of fine salt; the mixture is stirred for an hour, filtered, pressed and dried in vacuo at a moderate temperature.

Example 13

A compound of equivalent properties to that of the product of Example 12 is obtained by replacing in Example 12 the disodium salt of N-(2-carboxyphenyl)-glycine by 300 parts of the disodium salt of N-(2-carboxy-5-chlorophenyl)-glycine.

Example 14

338.5 parts by weight of 4'-nitro-4-amino-2:5-dimethoxy-azobenzene hydrochloride are formed into a paste with 15,000 parts of water at 45° C. When the mixture is homogenous 300 parts by volume of concentrated HCl are added and there is introduced below the surface of the liquid in the space of 1½ hours 1,000 parts by volume of a 10% solution of sodium nitrite. The mixture is further heated to 45–50° C. during one hour. A trace of insoluble matter is filtered off and the filtrate introduced in half an hour at between 5° C. and 10° C. into a solution formed from 260 parts by weight of the disodium salt of N-(2-carboxyphenyl)-glycine, 200 parts by weight of $Na_2CO_3$ and 1,000 parts of water. The compound is salted out by means of 1750 parts by weight of solid caustic soda and 4000 parts by weight of salt. The next day it is filtered, pressed and dried under vacuum at a moderate temperature.

Example 15

271.5 parts by weight of the amino azo compound of the formula

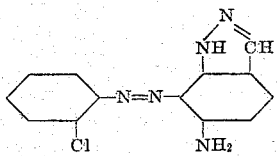

are dissolved in 3000 parts of warm water and 110 parts by volume of concentrated HCl. The solution is cooled at 5° C. by the addition of ice, a further 190 parts by volume of concentrated HCl is added and it is diazotized by introducing 140 parts by volume of a 50% $NaNO_2$ solution. The mixture is stirred for ¼ hour and the diazo derivative crystallises for the most part. The suspension of diazo compound is introduced into a solution formed from 260 parts by weight of the disodium salt of N-(2-carboxyphenyl)-glycine, 250 parts by weight of $Na_2CO_3$ and 1000 parts of water. A trace of insoluble matter is filtered off and the diazoamino derivative is precipitated by the addition of a mixture of solid caustic soda and salt. It is filtered, pressed and dried under a vacuum at 40° C.

Example 16

300 parts by weight of 2'-nitro-4-amino-5-methoxy-2:4'-dimethylazobenzene are formed into a paste in 2000 parts of water and 150 parts by volume of concentrated HCl. The mixture is stirred overnight. The next day a further 150 parts by volume of concentrated HCl are added and ice to keep the temperature between 5° C. and 10° C., then there is introduced under the surface of the liquid in the space of a quarter of an hour 140 parts by volume of a 50% $NaNO_2$ solution. The mixture is stirred for half an hour at 10° C., a trace of insoluble material is removed by filtration, and the solution of the diazo compound thus obtained introduced below the surface of the liquid in half an hour, at between 3° C. and 5° C. into a solution formed from 260 parts by weight of the disodium salt of N-(2-carboxyphenyl)-glycine, 250 parts by weight of $Na_2CO_3$ and 1000 parts of water. When the diazo derivative is totally absorbed, the solution is salted out with 2000 parts by weight of salt and 600 parts by weight of solid NaOH, the compound precipitated in fine reddish brown crystals is filtered, pressed and dried under vacuum at a moderate temperature.

Example 17

15 parts by weight of 4-chloro-2-amino-1-methyl-benzene are diazotized between 0 and 5° C. with 50 parts by volume of concentrated hydrochloric acid, 100 parts of water to which ice has been added and 7 parts by weight of sodium nitrite. The solution of the diazo compound is allowed to flow in 30 minutes under the surface of the liquid of a solution prepared from 25 parts by weight of N-(2-carboxyphenyl)-glycine-ethyl-ester of the formula

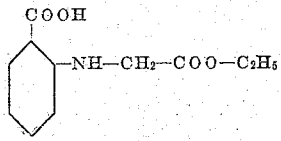

and 55 parts by weight of $Na_2CO_3$ dissolved in 250 parts of water; this solution is cooled to 0° C. Absorption of the diazo compound is instantaneous. The mixture is rendered alkaline to thiazole yellow paper with 90 parts by volume of a 30% by volume solution of caustic soda and filtered. The volume is then about 1,200 parts. The diazoamino derivative is precipitated by gradually adding 125 parts by weight of solid caustic soda in flakes and 150 parts by weight of sodium chloride. The temperature is 30° C. After two hours of stirring a further 100 parts by weight of caustic soda are added. After stirring for a few hours the very well formed crystals are filtered, pressed and dried at a moderate temperature. The yield is very good.

Example 18

15 parts by weight of 4-chloro-2-amino-1-methyl-benzene are diazotized as in the preceding example. Half of the solution of the diazo compound obtained is allowed to flow, for half an hour, under the surface of the liquid of a solution containing 24 parts by weight of N(2-carboxyphenyl)-glycinamide of the formula

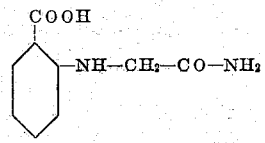

15 parts by volume of a 30% by volume solution of caustic soda and 50 parts by weight of $Na_2CO_3$ in 350 parts of water, keeping the temperature at 0° C. Then 20 parts by volume of a 30% by volume solution of caustic soda are added and the remainder of the solution of the diazo compound is introduced. The volume is then 900 parts. The absorption of the diazo compound is instantaneous. The mixture is rendered alkaline by 50 parts by volume of a 70% by volume solution of caustic soda, and then 100 parts by weight of sodium chloride and 100 parts by weight of caustic soda in flakes are added. The diazoamino derivative is precipitated wholly in the form of a paste then crystallized gradually. The crystals, isolated by filtration, are well pressed and dried at a moderate temperature.

Example 19

17 parts by weight of 2:5-dichloraniline are dissolved under the action of heat in 50 parts by volume of 20° Bé. hydrochloric acid and 150 parts of water. This solution is allowed to flow onto 150 parts by weight of ice and is diazotized with 16 parts by weight of a 50% by volume solution of sodium nitrite. After 30 minutes of stirring, half of the solution of the diazo compound obtained is allowed to flow under the surface of the liquid of a solution containing 35 parts by weight of N-(carboxyphenyl)-glycine-ethyl-ester, 16 parts by volume of a 30% by volume solution of caustic soda and 50 parts by weight of $Na_2CO_3$. The absorption of the diazo compound is instantaneous. Then 15 parts by volume of a 30% by volume caustic soda solution are added and the remainder of the diazo solution is then allowed to flow under the surface of the liquid. The temperature must be kept at 0° C. A further 50 parts by volume of a 70% by volume caustic soda solution are added and the mixture is filtered in the presence of a decolourising carbon. The volume is then about 1,200 parts. The diazoamino derivative is precipitated with 300 parts by weight of flake caustic soda and 100 parts by weight of sodium chloride. The mixture is stirred for one hour, filtered and pressed. After drying at a moderate temperature 41 parts by weight of dry product are obtained, titrating 31.7% of a base of molecular weight 162. The yield is approximately 80%.

We claim:

1. In a process for the preparation of a diazoamino derivative which involves condensation of a compound selected from the group consisting of diazo derivatives of aromatic monoamines and tetrazo derivatives of aromatic diamines not containing other solubilizing groups than the diazo group, in a medium having a pH of at least about 7.0, with an N-substituted derivative of glycine having the following general formula:

HOOC—A—NH—CH$_2$—CO—R wherein A represents a member selected from the group consisting of the unsubstituted o-phenylene group, the halogen-substituted o-phenylene group, the alkyl-substituted o-phenylene group and the alkoxy-substituted o-phenylene group and R represents a member selected from the group consisting of the hydroxyl group, the alkoxy group and the amino group, the improvement which comprises precipitating the product obtained by means of caustic soda.

2. In a process for the preparation of a diazoamino derivative which involves condensation of a compound selected from the group consisting of diazo derivatives of aromatic monoamines and tetrazo derivatives of aromatic diamines not containing other solubilizing groups than the diazo group, in a medium having a pH of at least about 7.0, with an N-substituted derivative of glycine having the following general formula:

HOOC—A—NH—CH$_2$—CO—R wherein A represents a member selected from the group consisting of the unsubstituted o-phenylene group, the halogen-substituted o-phenylene group, the alkyl-substituted o-phenylene group and the alkoxy-substituted o-phenylene group and R represents a member selected from the group consisting of the hydroxyl group, the alkoxy group and the amino group, the improvement which comprises precipitating the product obtained by means of a mixture of caustic soda and sodium chloride.

References Cited in the file of this patent

UNITED STATES PATENTS

| Number | Name | Date |
|---|---|---|
| 2,168,800 | Kracker et al. | Aug. 8, 1939 |
| 2,522,838 | Petitcolas et al. | Sept. 19, 1950 |
| 2,572,916 | Denton et al. | Oct. 30, 1951 |